(12) United States Patent
Noldus et al.

(10) Patent No.: US 8,363,811 B2
(45) Date of Patent: Jan. 29, 2013

(54) METHOD FOR CONTROLLING A MULTI PARTY CALL AND A SERVICE CONTROL ENTITY AND A SERVICE SWITCHING ENTITY FOR PERFORMING THE METHOD

(75) Inventors: Rogier August Caspar Joseph Noldus, Goirle (NL); Alfonso Pisani, Scafati (IT); Biagio Maione, Napoli (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 330 days.

(21) Appl. No.: 12/809,643

(22) PCT Filed: Dec. 21, 2007

(86) PCT No.: PCT/NL2007/050688
§ 371 (c)(1),
(2), (4) Date: Jun. 21, 2010

(87) PCT Pub. No.: WO2009/082195
PCT Pub. Date: Jul. 2, 2009

(65) Prior Publication Data
US 2010/0278323 A1    Nov. 4, 2010

(51) Int. Cl.
*H04M 3/42* (2006.01)

(52) U.S. Cl. .................. 379/202.01; 370/261; 709/204; 709/227

(58) Field of Classification Search ............. 379/202.01; 370/261; 709/204, 227
See application file for complete search history.

(56) References Cited

U.S. PATENT DOCUMENTS

| 5,526,415 A | 6/1996 | Wakamoto |
| 6,078,658 A | 6/2000 | Yunoki |
| 2002/0003869 A1 | 1/2002 | Cho |

FOREIGN PATENT DOCUMENTS

| JP | H02-051958 A | 2/1990 |
| WO | WO 00/65849 A | 11/2000 |

*Primary Examiner* — Quynh Nguyen

(57) ABSTRACT

The invention relates to a method for controlling a multi party call between three or more communication entities within a communications network. The communications network comprise a service control entity and a service switching entity. The service control entity performs: a) receiving a notification of a multi party event associated with the multi party call from the service switching entity, b) determining a procedure for handling the multi party event, c) transmitting instructions to the service switching entity in accordance with the procedure for handling the multi parry event.

12 Claims, 5 Drawing Sheets

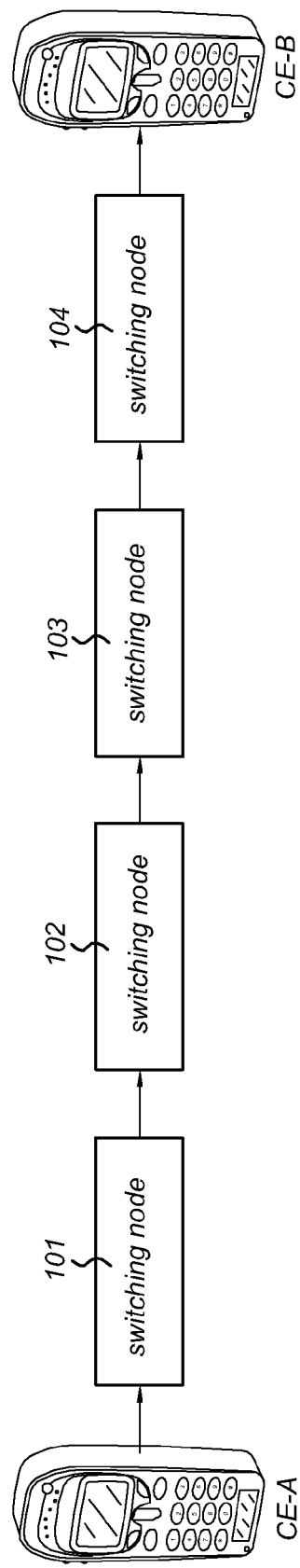
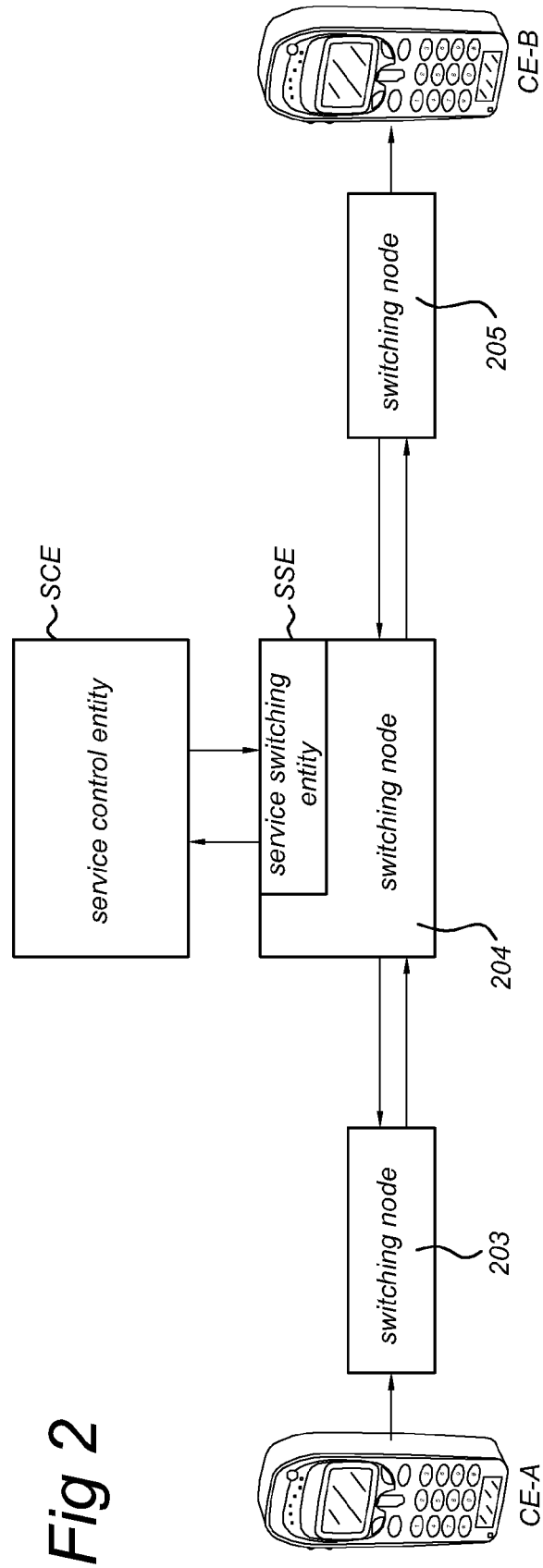

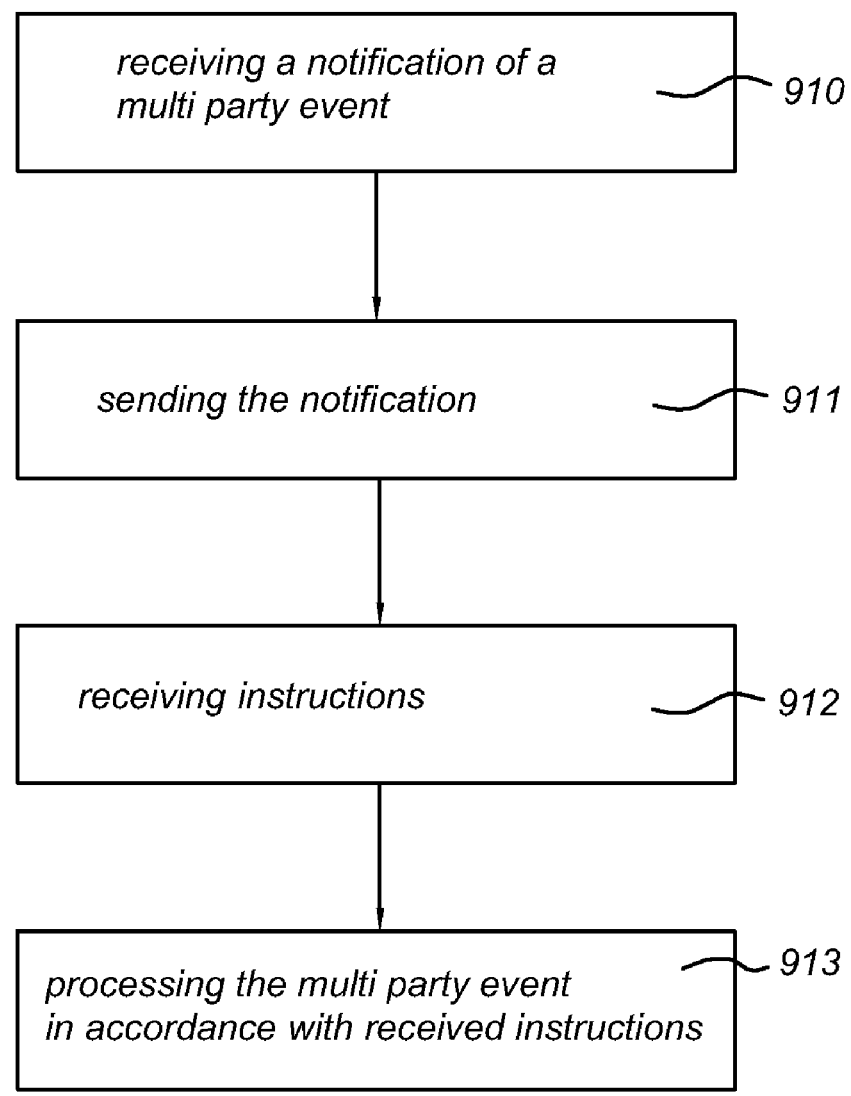

METHOD FOR CONTROLLING A MULTI PARTY CALL AND A SERVICE CONTROL ENTITY AND A SERVICE SWITCHING ENTITY FOR PERFORMING THE METHOD

TECHNICAL FIELD

The invention relates to a method for controlling a multi party call between three or more communication entities within a communications network, a service control entity adapted to perform the method and a service switching entity adapted to perform the method. The invention further relates to a computer program loadable into a processing unit of such a service control entity or service switching entity and a computer-readable medium product comprising such a computer program.

BACKGROUND

A network may be provided enabling communication entities to communicate with each other. The communication entities may be wireline telephones, mobile telephones or any other suitable device. The communication entities that initiate communication may be referred to as calling entities and the communication entities with which the calling parties initiate communication are referred to as remote entities or called entities.

In the telecommunications network a call initiated by a calling entity and destined for a remote entity is routed through a number of switching nodes before this call reaches its destination. An example of how a call may be routed from a calling entity to a remote entity in a telecommunications network is given with reference to FIG. 1. A calling entity CE-A sets up a call to a called entity CE-B by sending a call set up request message to a switching node 101. The switching node 101 receives the call set up request message and analyses the destination number comprised therein, i.e. typically a number associated to called entity CE-B. Depending on the outcome of the analysis the switching node 101 will select the most appropriate next switching node for routing the call further in the most efficient way. In this example the switching node 101 selects a switching node 102. Switching nodes 102 and 103 behave in a similar way and route the call further towards switching node 104, which is closest to the called entity CE-B. Switching nodes 102 and 103 are sometimes also referred to as transit switching nodes, because they function as transits between switching nodes 101 and 104. The switching node 104 then connects the incoming call to called entity CE-B and a speech connection may be opened between calling entity CE-A and called entity CE-B.

According to the Intelligent Network (IN) concept, service intelligence or service logic is separated from switching functions. This separation enables network operators to develop and deploy services and features independently of network vendors, allowing more flexibility in service development, simplified rollout, reduced cost and greater autonomy. Examples of IN protocols are the Intelligent Network Application Protocol (INAP), the Advanced IN (AIN), and the Customized Applications for Mobile network Enhanced Logic (CAMEL). INAP was developed for fixed line networks and is the primary protocol used for fixed line IN outside of North America. AIN is a variant developed for North America.

CAMEL

CAMEL is a Global System for Mobile communications (GSM) Phase 2+ and Wideband Code Division Multiple Access (WCDMA) network feature specified in 3GPP TS 22.078. CAMEL is based on core INAP with modifications to take into account, amongst others, subscriber mobility. In particular, CAMEL enables the use of operator-specific services by a subscriber even when roaming outside the subscriber's Home Public Land Mobile Network (PLMN). A CAMEL-based Intelligent Network comprises as main entities a service switching entity for switching tasks, also referred to as SSF (Service Switching Function) or gsmSSF (GSM Service Switching Function) and a service control entity comprising the service intelligence or logic also referred to as SCF (Service Control Function) or gsmSCF (GSM Service Control Function).

FIG. 2 depicts a schematic overview of a telecommunications network comprising an intelligent network.

The intelligent network comprises a service control entity SCE and a service switching entity SSE, which will both be explained in more detail below. Furthermore, switching nodes 203, 204 and 205 are depicted, each of which may be a Mobile Services Switching Centre (MSC). The switching node 203 may function as an originating node; the switching node 204 may be a transit switching node and the switching node 205 may be a terminating node.

Intelligent networks services are executed at the service control entity SCE. The service control entity SCE is able to communicate with the service switching entity SSE using an intelligent network protocol such as CAMEL or INAP. The service switching entity SSE, when controlling the call from calling entity CE-A to called entity CE-B, is preferably co-located with switching node 203, but may also be co-located at another switching node.

The service control entity SCE has a leading role in the intelligent network and may decide that some services are allowed or disallowed for a call. It sends instructions to the service switching entity SSE to be carried out by the service switching entity SSE.

With the application of the intelligent network concept, there are effectively two levels of call control: (1) call control by the switching node and (2) call control by the SCE. Because of the two levels of control that are also separate from each other, inconsistencies may occur when an IN service is invoked for a call that may be in addition subject to a service executed at a switching node. This may be, for example, the case when a first communication entity CE-A sets up a multi party call. Prior to the establishment of the multi party call, the first communication entity CE-A may be involved in two calls, a first call with a second communication entity CE-B which is active and on hold, and a second call with a third communication entity CE-C (explained below with reference to FIG. 6) which is active and in speech connection. The first communication entity CE-A may then initiate a multi party call in which the two calls are merged (explained below with reference to FIG. 7).

Multi Party Service

Multi party service is a so-called supplementary service or network based service that is executed by and under the control of switching nodes, such as MSCs. The multi party service provides a first communication entity CE-A (calling or called entity) with the ability to establish a multi-connection call, i.e. a simultaneous communication with a second and third communication entities. In fact, also more then three communication entities may be involved. The communication entity having established a multi party call may be referred to as "multi party served subscriber" or "multi party served entity". It be emphasised that when an entity establishes a multi party call, the respective calls that are connected to or from this call entity may, independently of each other, be incoming or outgoing. The communication entities that participate in the multi party call but did not initiate the multi party call are also referred to as remote communication entities.

For the GSM and the 3G network, the Multi party service is specified in 3GPP technical specification 22.084.

For example, the multi party served entity CE-A is involved in two calls; one active call in speech connection with second communication entity CE-B and one active call on hold with third communication entity CE-C, both calls having been answered by the respective called second and third communication entity CE-B, CE-C respectively. In this situation the multi party served subscriber CE-A may request the network to execute the multi party service.

Once a multi party call is established, additional communication entities may be added to the multi party call, disconnected from the multi party call, temporarily separated (i.e. removed) from the multi party call and, when temporarily separated, reconnected to the multi party call.

Subscribers or communication entities participating to a multi party call may be referred to as conferee.

An acknowledgement is sent towards the multi party served subscriber CE-A at the invocation of this supplementary service while a notification is sent towards all the remote parties in a multi party call. The multi party call will, just after it has been established, be constituted just by three parties, that is the multi party served subscriber (first communication entity CE-A) and the other two subscribers (second and third communication entity CE-B and CE-C) that till the moment of invocation were engaged in two separated calls with the multi party served subscriber (first communication entity CE-A). At this stage other communication entities (fourth, fifth etc.) can be included in the multi party call if the multi party served subscriber decides hereto. A notification may be sent towards all remote communication entities, i.e. second, third etc. communication entities (i.e. not towards the multi party served subscriber CE-A) every time a new communication entity is added to the multi party call. Notifications may also be sent to remote communication entities when they are put on hold and when they are retrieved; these notifications related to hold and retrieve are in accordance with normal Call Hold procedures.

The multi party service as stated before, is a network based service that is executed by and under control of switching nodes, whereas IN services are executed under the control of a service control entity and invoked for certain calls only. Because of the two levels of control that are also separate from each other, inconsistencies may occur when an IN service is invoked for a call that may be in addition subject to a multi party service executed at a switching node.

It is an object to provide a solution to improve the handling of a multi party call in a telecommunications network.

SUMMARY

According to an embodiment, a method is provided for controlling a multi party call between three or more communication entities within a communications network. The communications network comprises a service control entity and a service switching entity. The service control entity may perform:

a) receiving a notification of a multi party event associated with the multi party call from the service switching entity, b) determining a procedure for handling the multi party event, c) transmitting instructions to the service switching entity in accordance with the procedure for handling the multi party event.

According to a further embodiment, the method further comprises requesting the service switching entity to send a notification of an indicated multi party event.

The notification of the multi party event may comprise a request from one of the three or more communication entities for setting up the multi party call. The instructions for handling the multi party event comprise a permission indicator indicating whether or not the multi party call is allowed.

Action b) may comprise applying service logic.

The notification of the multi party event may comprise an indication of at least one communication entity associated to the multi party event.

Action b) may further comprise applying service logic in combination with the indication of the at least one communication entity associated to the multi party event.

The multi party event comprises one of
Conference Established (66),
Conference Disconnected (67),
Other Party Added (68),
Isolated (69),
Reattached (70),
Other Party Isolated (71),
Other Party Reattached (72),
Other Party Split (73),
Other Party Disconnected (74),
Conference Floating (75).

Furthermore there is provided a service control entity adapted to perform the method according to the above.

According to a further embodiment there is provided a method for controlling a multi party call between three or more communication entities within a communications network. The communications network comprises a service control entity and a service switching entity. The service control entity may perform:

a) receiving a notification of a multi party event associated with the multi party call b) sending the notification to the service control entity, c) receiving instructions from the service control entity in accordance with a procedure for handling the multi party event, and d) processing the multi party event in accordance with the received instructions.

According to an embodiment, the method may further comprise receiving a request from the service control entity to send a notification of an indicated multi party event.

The notification of the multi party event may comprise a request from one of the three or more communication entities for setting up the multi party call. The instructions for handling the multi party event may comprise a permission indicator indicating whether or not the multi party call is allowed.

Action d) may comprise disallowing or allowing the multi party event in accordance with the permission indicator.

The notification of the multi party event may comprise an indication of at least one communication entity associated to the multi party event.

The multi party event may comprise one of
Conference Established (66),
Conference Disconnected (67),
Other Party Added (68),
Isolated (69),
Reattached (70),
Other Party Isolated (71),
Other Party Reattached (72),
Other Party Split (73),
Other Party Disconnected (74),
Conference Floating (75).

According to an embodiment there is provided a service switching entity adapted to perform the method according to above.

According to an embodiment there is provided a computer program loadable into a processing unit of a service control entity or a service switching entity, the computer program comprising portions of software code adapted to perform any one of the methods according to the above.

Furthermore, according to an embodiment there is provided a computer-readable medium product comprising a computer program according to the above.

BRIEF DESCRIPTION OF THE DRAWINGS

Embodiments will now be described, by way of example only, with reference to the accompanying schematic drawings in which corresponding reference symbols indicate corresponding parts, and in which:

FIG. 1 shows a first schematic illustration of a telecommunications network for routing of a call according to the prior art, FIG. 2 shows a schematic illustration of a telecommunications network according to an embodiment of the invention.

FIG. 9 shows a flow diagram according to a further embodiment.

DETAILED DESCRIPTION

With reference to FIG. 2 an explanation is provided of a communications network, comprising network elements such as a service switching entity SSE for switching tasks and a service control entity SCE comprising the service intelligence or logic. Both the service control entity SCE and the service switching entity SSE may be formed as computers, embodiments of which are described below. Of course, also other network elements, such as switching nodes may be provided that are formed as computers as described with reference to FIG. 3.

Figure 3:
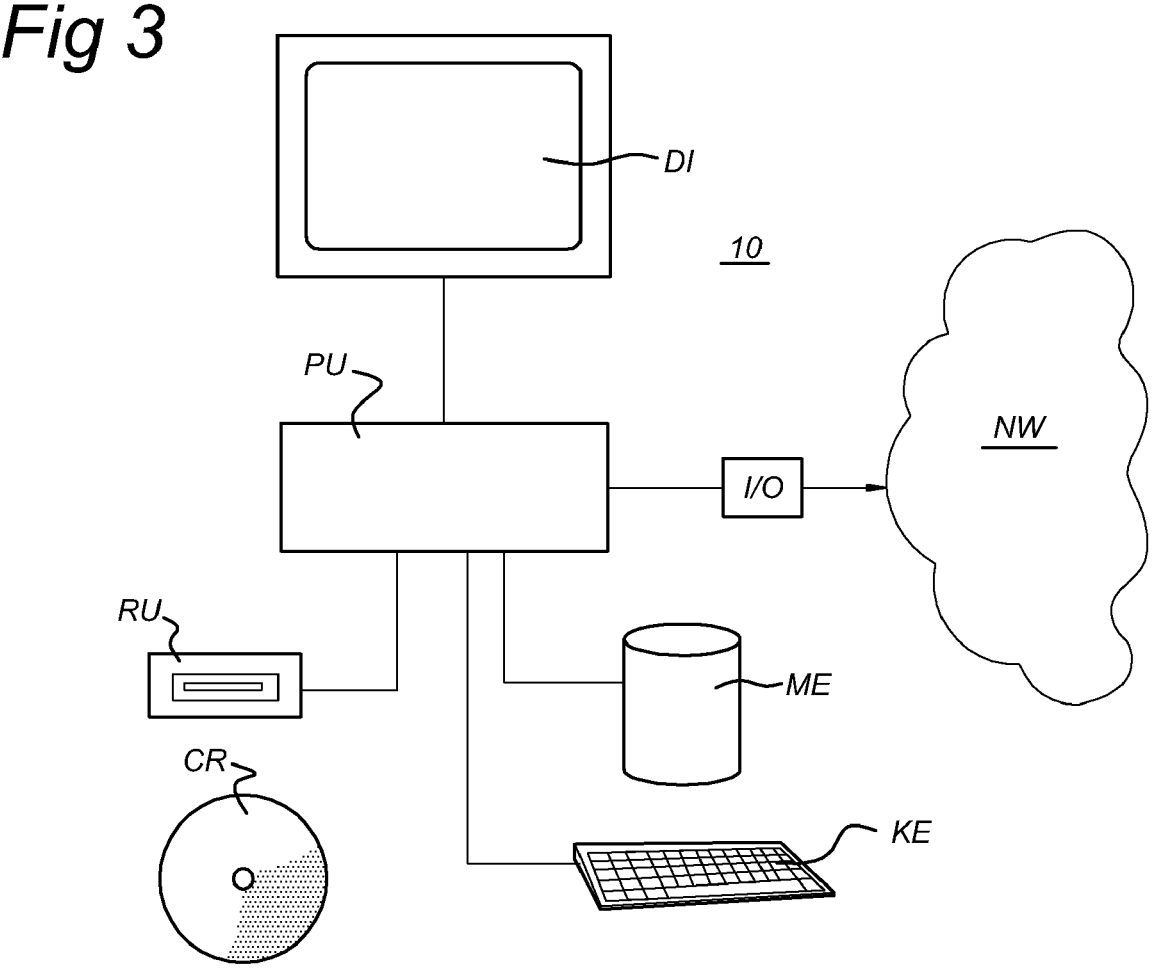
FIG. 3 shows a schematic illustration of a general computer.

In fact, all network elements, including communication entities, described in the embodiments may be formed as a computer. FIG. 3 schematically shows a general embodiment of an example of a computer. The description may refer to several kinds of devices, such as personal computers, servers, laptops, personal digital assistances (PDA), palmtops, telephones. All these devices may be different kind of computers.

FIG. 3 shows a schematic block diagram of an embodiment of a computer 10, comprising a processor unit PU for performing arithmetical operations. The processor unit PU is connected to memory ME that may store instructions and data. The memory ME may be formed by one or more of a tape unit, hard disk, Read Only Memory (ROM), Electrically Erasable Programmable Read Only Memory (EEPROM) and Random Access Memory (RAM). The memory ME may comprise instructions that are readable and executable by the processor unit PU to enable the computer 10 to perform the embodiments described.

The processor unit PU may also be connected to one or more input devices, such as a keyboard KE, and one or more output devices, such as a display DI, and one or more reading units RU to read for instance a floppy, CD ROM's CR, a DVD.

The computer 10 shown in FIG. 3 also comprises an input output device (I/O) that is arranged to communicate with other computers (not shown) via a network, for instance the intelligent network. Of course, the input output device (I/O) may also be formed as a separate input device I and output device O.

However, it should be understood that there may be provided more and/or other memory units, input devices and read devices known to persons skilled in the art. Moreover, one or more of them may be physically located remote from the processor unit PU, if required. The processor unit PU is shown as one box, however, it may comprise several processor units functioning in parallel or controlled by one main processor unit that may be located remote from one another, as is known to persons skilled in the art.

It is observed that, although all connections in FIG. 3 are shown as physical connections, one or more of these connections can be made wireless. They are only intended to show that "connected" units are arranged to communicate with one another in some way.

The computer 10 is shown as a computer, but can be any signal processing system with analogue and/or digital and/or software technology arranged to perform the functions discussed here.

As described in the discussion of the background, a CAMEL-based Intelligent Network comprises as main entities a service switching entity SSE for switching tasks, also referred to as SSF (Service Switching Function) or gsmSSF (GSM Service Switching Function) and a service control entity SCE comprising the service intelligence or logic also referred to as SCF (Service Control Function) or gsmSCF (GSM Service Control Function). Both the service control entity SCE and the service switching entity SSE may also be formed as computers, embodiments of which are described below.

Service Control Entity

Figure 4:
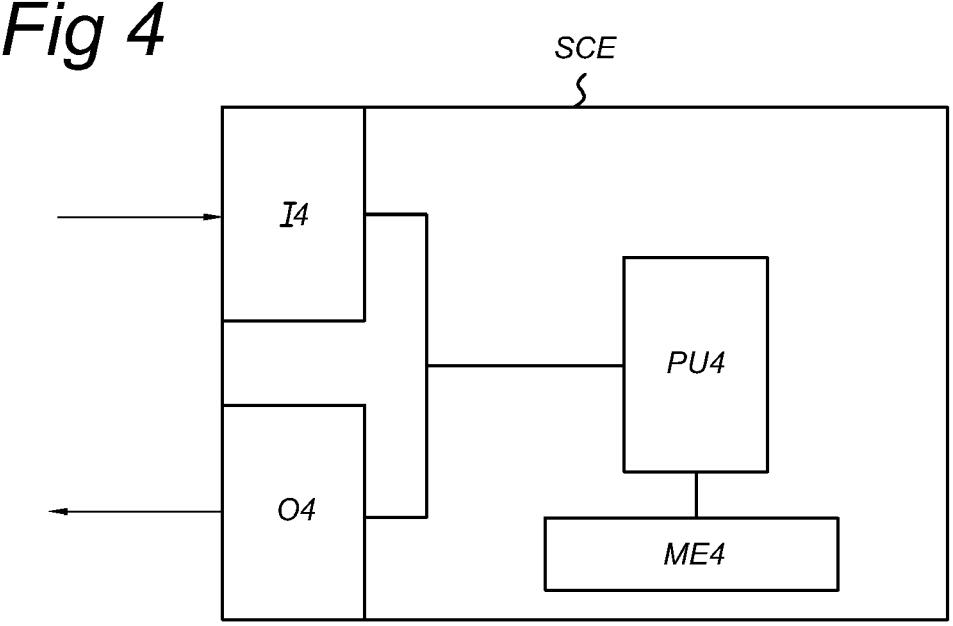
FIG. 4 shows a block diagram of an embodiment of a service control entity.

FIG. 4 depicts an embodiment of a service control entity SCE comprising an input device I4 for receiving messages and an output device O4 for transmitting messages, a processor unit PU4 for processing messages and information and memory ME4 for storing and/or obtaining of information.

A service control entity SCE may be a stand alone device and input device I4 and output device O4 being external interfaces like a receiving unit for receiving messages and a transmission unit for transmitting messages, respectively. However, it is also conceivable that a service control entity SCE is operating at a switching node, e.g. as a hardware and/or software sub-unit of the switching node. The service control entity SCE may be installed and operated at the switching node sharing none of the units I4, O4, P4, ME4 with the switching node or sharing at least one of the units I4, O4, P4, ME4 with units of a switching node. An alternative embodiment is a service control entity SCE according to a computer program loaded into the processing unit of a switching node.

Service Switching Entity

Figure 5:
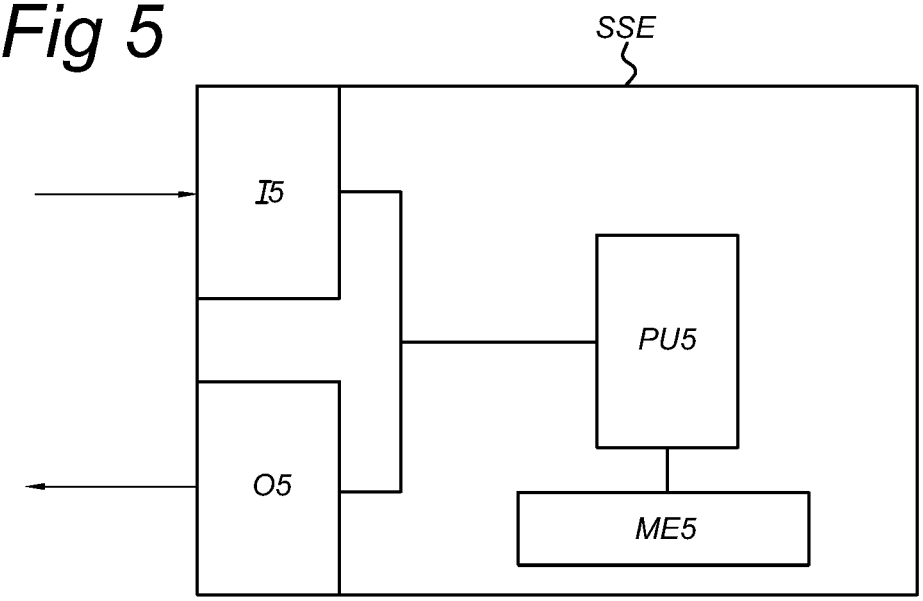
FIG. 5 shows a block diagram of an embodiment of a service switching entity.

FIG. 5 depicts an embodiment of a service switching entity SSE comprising an input device I5 for receiving messages and an output device O5 for transmitting messages, a processor unit PU5 for processing messages and information, and memory ME5 for storing and/or obtaining of information.

A service switching entity SSE may be a stand alone device and input device I5 and output device O5 being external interfaces like a receiving unit for receiving messages and a transmission unit for transmitting messages, respectively. Preferably, a service switching entity SSE is operating at a switching node, e.g. as a hardware and/or software sub-unit of the switching node. The service switching entity SSE may be installed and operated at the switching node sharing none of the units I5, O5, PU5, ME5 with the switching node or sharing at least one of the units I5, O5, PU5, ME5 with units of a switching node comprising an input device for receiving messages, an output unit for sending messages, a processor unit for processing messages and information, and preferably a memory. According to an embodiment a service switching entity SSE is provided according to a computer program loaded into the processor unit of a switching node.

A problem may occur when the CAMEL service allows the call to become part of a multi party call. If the first communication entity CE-A invokes a multi party service for this call, i.e. joins the call that is in speech connection with the second communication entity CE-A and the held call with the third communication entity CE-C into the conference call, then the CAMEL service of the respective calls from this subscriber will not be aware that the call has changed into a multi party call. This is further explained with reference to FIGS. 6 and 7.

Figure 6:
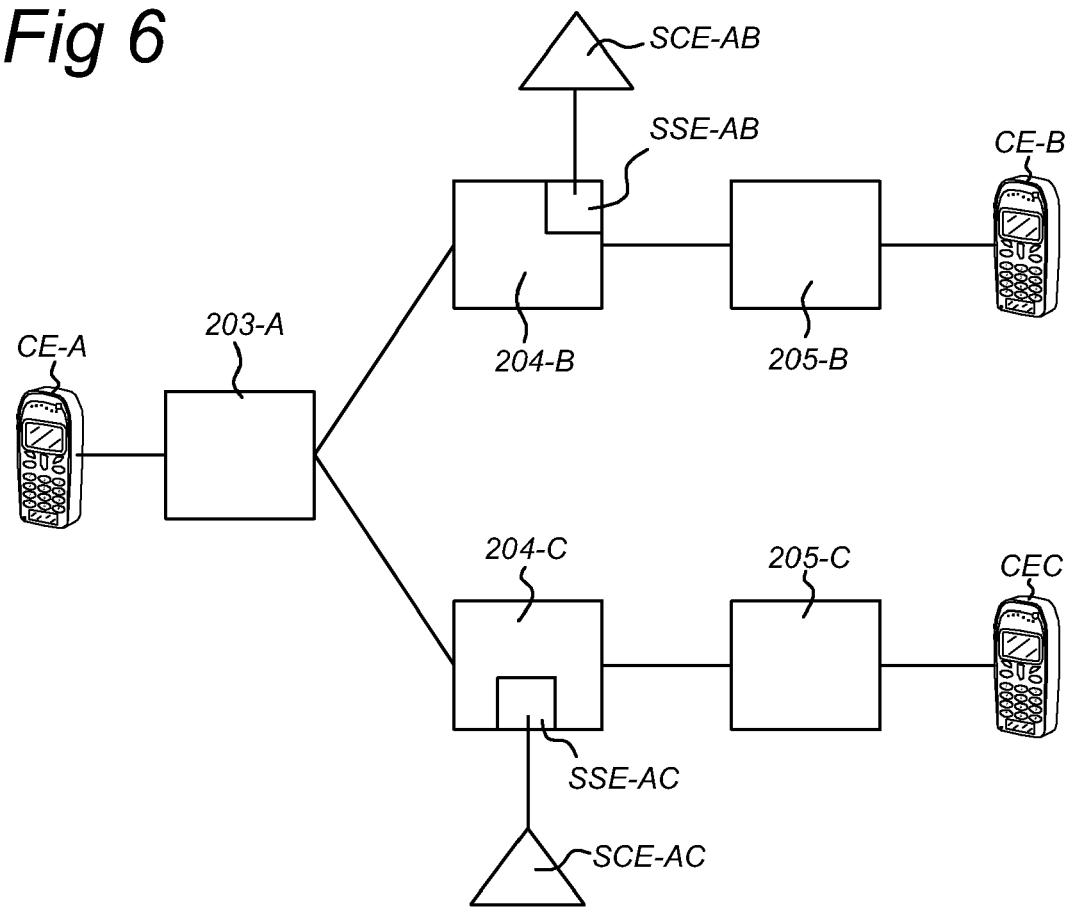
FIG. 6 shows network architecture for a first communication entity having two calls established, prior to the establishment of a multi party call.

FIG. 6 depicts the situation before the first communication entity CE-A invokes a multi party call. Two originating calls have been started from the first communication entity CE-A: one call between the first communication entity CE-A and the second communication entity CE-B and another call between the first communication entity CE-A and the third communication entity CE-C. Two legs are created. The first leg comprises switching nodes 203-A (A-B), 204-B, 205-B and first service switching entity SSE-AB.

The indication A-B in the text is used to indicate that it refers to the process for the connection between first communication entity CE-A and second communication entity CE-B. Likewise, the indication A-C as used below is used to indicate that it refers to the process for the connection between first communication entity CE-A and third communication entity CE-C. So, switching node 203-A (A-B) refers to the process in switching node 203 for the call from the first communication entity CE-A to the second communication entity CE-B; likewise, switching node 203-A (A-C) refers to the process in switching node 203 for the call from first communication entity CE-A to third communication entity CE-C.

The second leg comprises switching nodes 203-A (A-C), 204-C, 205-C and second service switching entity SSE-AC.

ISDN User Part (ISUP), Bearer Independent Call Control (BICC) or SIP-I signalling is used between the respective switching nodes 203, 204 and 205. The remainder of the present invention refers only to ISUP; the informed reader will understand that BICC and SIP-I may be used as well, where applicable.

Figure 7:
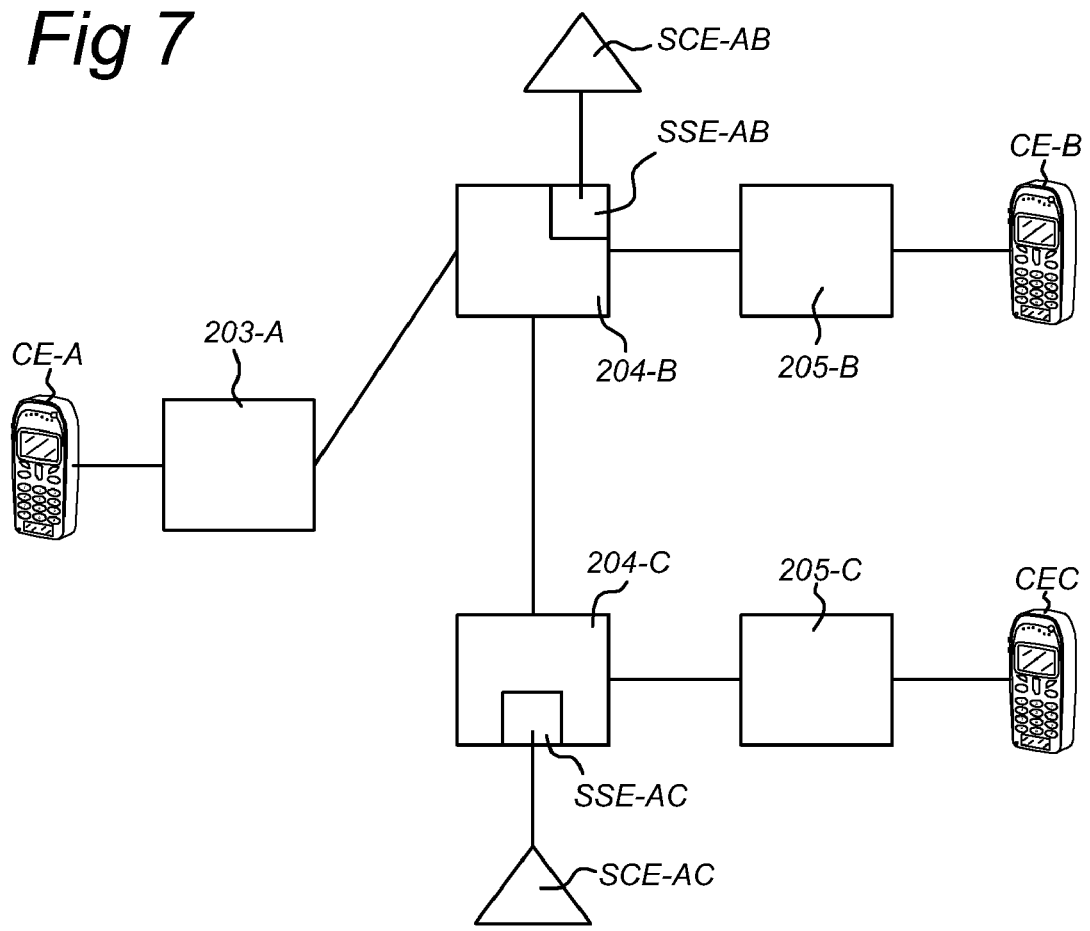
FIG. 7 shows network architecture for a first communication entity having two calls established, after the establishment of a multi party call.

FIG. 7 depicts the situation after the first communication entity CE-A has invoked the multi party call service. Two instances of service switching entities SSE are present in the call chain, the first service switching entity SSE-AB and the second service switching entity SSE-AC.

The first service control entity SCE-AB could instruct the first service switching entity SSE-AB to be informed of call events such as Call answer or Call disconnect. However, the service control entities SCE-AB, SCE-AC would not know that a multi party call is established.

When the multi party call is established, the second and third communication entities CE-B and CE-C are put in conference and speech information from the first, second and third communication entities CE-A, CE-B and CE-C is routed through a conference device located in or controlled by switching node 203-A. Each communication entity in the conference call will receive the combined speech of the other communication entities in the conference call. From this moment on, whatever information (such as credit information) is sent on the speech channel under control by a service control entity SCE towards one communication entity is heard also by the other communication entities.

After the conference call is established, one of the two service control entities SCE-AB or SCE-AC might instruct the service switching entity SSE-A that it is connected to, i.e. SSE-AB or SSE-AC respectively, to send in-band information (tone or announcement) towards the first communication entity CE-A. This information would actually be heard also by one or more other communication entities CE-B, CE-C, for whom the information is not intended.

Furthermore, the identity of the second and third communication entities CE-B, CE-C participating to the multi party call will not be known to the respective service control entities SCE. Hence, if a service control entity SCE wants for example certain subscribers not to participate in international conference call, then the service control entity SCE is not able to enforce this policy, since (a) the service control entity SCE does not know that a multi party call call is established and (b) the service control entity SCE does not know the identities of the all participants in the multi party call. For instance, the service control entity SCE-AB only knows the identity of the first and second communication entities for the respective call. It be emphasised again that the call legs in a conference call are controlled by independent service control entities SCE instances.

According to ITU-T recommendation Q.734, when an MSC wishes to notify a remote party of a multi party invocation on the part of a served user, an ISUP Call Progress (CPG) message is used with the 'Generic Notification' parameter that may contain the following indications:

Conference established,
Conference disconnected,
Other party added,
Isolated,
Reattached,
Other party isolated
Other party reattached,
Other party split,
Other party disconnected,
Conference floating.

The ISUP CPG message does not have the capability to convey the number of the conferee to which the multi party event, as indicated in the ISUP CPG, applies.

Embodiments

Below, several embodiments are provided that overcome the above mentioned drawbacks.

Service Control Entity

Figure 8:
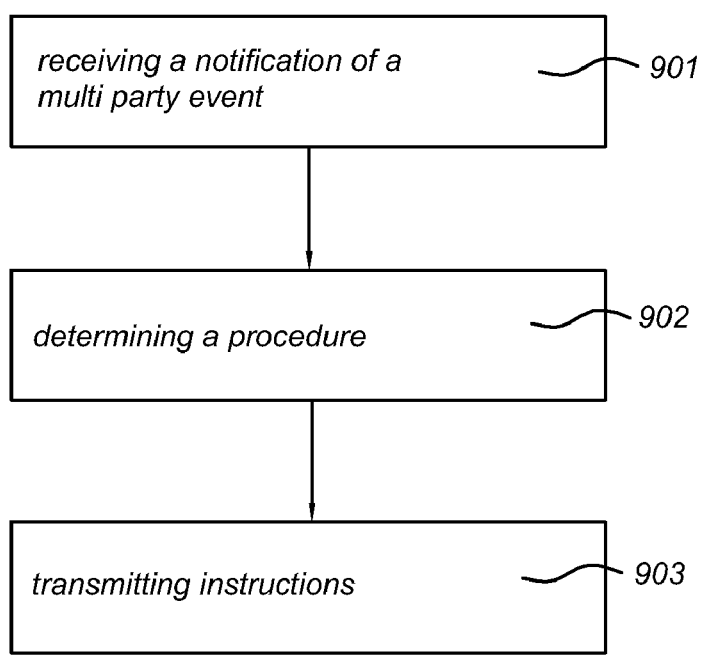
FIG. 8 shows a flow diagram according to an embodiment.

According to an embodiment there is provided a method as shown in FIG. 8. The method may be performed by the service control entity SCE for controlling a multi party call between three or more communication entities within a communications network, the communications network comprising a service control entity and a service switching entity, wherein the service control entity performs:

a) receiving a notification of a multi party event associated with the multi party call from the service switching entity (action 901), b) determining a procedure for handling the multi party event (action 902), c) transmitting instructions to the service switching entity in accordance with the procedure for handling the multi party event (action 903).

According to an embodiment, the method further comprises requesting the service switching entity to send a notification of an indicated multi party event. This may be done before action 901, to instruct the service switching entity SSE such that a notification of a specific multi party event is received in action 901. This enables the service control entity SCE to receive only notifications of those multi party events in which it is interested and hence leads to greater flexibility for the service control entity SCE when controlling the multi party call. For example, the service control entity SCE may indicate to the service switching entity SSE that it is only interested to receive an indication of the following multi party events: conference established, other party added, other party disconnected. As a result, the service control entity SCE does not receive a notification of any of the other multi party events According to an embodiment, the notification of the multi party event comprises a request from one of the three or more communication entities CE-A, CE-B, CE-C for setting up the multi party call and the instructions for handling the multi party event comprise a permission indicator indicating whether or not the multi party call is allowed. Based on the permission indicator the service switching entity can decide whether or not to allow the setting up of the multi party event.

According to an embodiment action 902 comprises applying service logic.

According to an embodiment, the notification of the multi party event comprises an indication of at least one communication entity CE-A, CE-B, CE-C associated to the multi party event. The service control entity SCE is now informed of the identity of the communication entities involved in the multi party call and is enabled to take further action based on this information.

According to an embodiment, the b) (action 902) further comprises applying service logic in combination with the indication of the at least one communication entity associated to the multi party event. This indication of the at least one communication entity CE-A, CE-B, CE-C can be used when applying the service logic to decide on the appropriate procedure. For instance, if the second communication entity CE-B is an foreign communication entity compared to the first communication entity CE-A, and the service logic doesn't allow this, the procedure may be to abort the request for setting up the multi party call.

The multi party events may be one of
Conference Established (66),
Conference Disconnected (67),
Other Party Added (68),
Isolated (69),
Reattached (70),
Other Party Isolated (71),
Other Party Reattached (72),
Other Party Split (73),
Other Party Disconnected (74),
Conference Floating (75).

An embodiment of a service control entity SCE as shown in FIG. 4 is provided that is arranged to perform the method as described with reference to FIG. 8.

A service control entity SCE may be provided as shown in FIG. 4, for performing a method for controlling a multi party call between three or more communication entities within a communications network, the communications network comprising a service control entity and a service switching entity.

The service control entity SCE comprises an input device I4 for receiving messages and an output device O4 for transmitting messages, a processor unit PU4 for processing messages and information and memory ME4 for storing and/or obtaining of information.

The processor unit PU4 may be adapted to process a notification of a multi party event associated with the multi party call received via input device I4 from the service switching entity (action 901).

Also, the processing unit PU4 may be adapted to determine a procedure for handling the multi party event (action 902).

Furthermore, the processing unit PU4 may be adapted to initiate the transmission via the output device O4 of instructions to the service switching entity SSE in accordance with the procedure for handling the multi party event (action 903).

According to an embodiment there is provided a computer program loadable into a processing unit of a service control entity SCE, the computer program comprising portions of software code adapted to perform the method as described with reference to FIG. 7. The computer program may be comprised by a computer-readable medium.

According to a further embodiment there is provided a computer program loadable into a processing unit PU4 of a service control entity SCE, the computer program comprising portions of software code adapted to perform the method as described above with reference to FIG. 8.

According to a further embodiment there is provided a computer-readable medium product comprising such a computer program.

Service Switching Entity

According to an embodiment, there is provided a method as shown in FIG. 9. The method may be performed by a service switching entity SSE for controlling a multi party call between three or more communication entities within a communications network, the communications network comprising a service control entity and a service switching entity, wherein the service control entity performs:

a) receiving a notification of a multi party event associated with the multi party call (action 910), b) sending the notification to the service control entity (action 911), c) receiving instructions from the service control entity in accordance with a procedure for handling the multi party event (action 912), and d) processing the multi party event in accordance with the received instructions (action 913).

According to an embodiment the method further comprises receiving a request from the service control entity to send a notification of an indicated multi party event.

According to an embodiment the notification of the multi party event comprises a request from one of the three or more communication entities for setting up the multi party call and wherein the instructions for handling the multi party event comprise a permission indicator indicating whether or not the multi party call is allowed.

According to an embodiment, the notification of the multi party event comprises an indication of at least one communication entity associated to the multi party event.

According to an embodiment d) (action 913) comprises disallowing or allowing the multi party event in accordance with the permission indicator.

According to an embodiment, the multi party event comprises one of
Conference Established (66),
Conference Disconnected (67),
Other Party Added (68),
Isolated (69),
Reattached (70),
Other Party Isolated (71),
Other Party Reattached (72),
Other Party Split (73),
Other Party Disconnected (74),
Conference Floating (75).

An embodiment of a service switching entity SSE as shown in FIG. 5 is provided that is arranged to perform the method as described with reference to FIG. 9.

A service switching entity SSE may be provided as shown in FIG. 5, for performing a method for controlling a multi party call between three or more communication entities within a communications network, the communications network comprising a service switching entity SSE and a service switching entity SCE. The service switching entity SSE comprises an input device I5 for receiving messages and an output device O5 for transmitting messages, a processor unit PU5 for processing messages and information and memory ME5 for storing and/or obtaining of information.

The processor unit PU4 may be adapted to process a notification of a multi party event associated with the multi party call received via input device I4 (action 910).

The processor unit PU4 may be adapted to initiate the sending via output device O4 of the notification to the service control entity (action 911).

The processor unit PU4 may be adapted to process instructions received via input device I4 from the service control entity in accordance with a procedure for handling the multi party event (action 912).

Finally, the processor unit PU4 may be adapted to process the multi party event in accordance with the received instructions (action 913).

According to a further embodiment there is provided a computer program loadable into a processing unit PU5 of a service switching entity SSE, the computer program comprising portions of software code adapted to perform the method as described above with reference to FIG. 9.

According to a further embodiment there is provided a computer-readable medium product comprising such a computer program.

IN protocols like INAP and CAMEL Application Part (CAP, e.g. CAPv4, see 3GPP TS 29.078 and 3GPP TS 23.078) are preferably amended by at least one of the following detailed enhancements to provide a service switching entity SSE and a service control entity SCE with the capabilities according to the invention:

a) A new Event Detection Point (EDP), 'multi party event', may be defined to indicate that a multi party event has occurred in the call from the CAMEL subscriber. This EDP is defined for both the Originating basic call state model (O-BCSM) and the Terminating basic call state model (T-BCSM).
The call leg on which the event will be reported will be the leg in the service switching entity SSE that receives the ISUP Call Progress (CPG) message carrying the notification of the occurrence of the MPTY event.

b) A new BCSM event may be added to the Request Report BCSM (RRB) message from the service control entity SCE to the service switching entity SSE to arm the new EDP multi party event. The service control entity SCE may use the Request Report BCSM message comprising the new BCSM event to request the service switching entity SSE to send a notification of an indicated multi party event.

c) A new BCSM event may be added to the Event Report BCSM (ERB) message from the service switching entity SSE to the service control entity SCE to report the new EDP multi party event to the service control entity SCE. The service switching entity SSE may use the Event Report BCSM message comprising the new BCSM event to send the notification of the multi party event to the service control entity SCE.

d) In the Event Report BCSM (ERB) message the parameter "Detection Point (DP) specific info" may be enhanced with the capability to convey an indication, i.e. a directory number, of the communication entity associated to the multi party event, e.g. the communication entity that is added, isolated, reattached. The indication may be referred to as conferee number. The service switching entity may use the Event Report BCSM comprising the enhanced parameter to send the notification of the multi party event comprising an indication of at least one communication entity associated to the multi party event to the service control entity SCE.

Furthermore also the ISUP protocol is preferably amended by the following enhancement to provide a service switching entity and a service control entity with the capabilities according to the invention.

a) The ISUP Call Progress (CPG) message may be enhanced to carry, in addition to the multiparty event notification, the conferee number of the communication entity associated to the multi party event.

Advantages

According to the prior art, when the first entity CE-A requests to establish a multi party call, this request is processed and executed by the switching nodes 203 and (to a lesser extent) by the switching nodes 204 and 205. This may cause problems and unwanted situations, as the service control entity SCE will not know that the first communication entity CE-A has initiated the establishment of a multi party call. For instance, the service control entity SCE may need to verify whether the first communication entity CE-A has permission to start a multi party call and if so, whether the first communication entity CE-A has permission to set up a multi party call with the particular second and third communication entities CE-B and CE-C. The first communication entity CE-A may for instance not be allowed to set up an international multi party call. Also, the SCE may want to restrict the number of participants to a defined maximum.

An additional problem, resulting from the fact that the service control entity SCE is not aware of the establishment of a multi party call, is that the service control entity SCE could instruct the service switching entity SSE to send in-band information (e.g. an announcement) to a subscriber without knowing that the in-band information may also be heard by other parties in the call.

According to the embodiments, this drawback is overcome by making the service control entity SCE aware of the establishment of the multi party call.

The service control entity SCE will get informed about multi party events such as multi party invocation and new connected subscribers identity, so is enabled to act accordingly. This facilitates the SCE to permit, at call establishment, the establishment of a multi party call during that call. When a multi party call is established during that call, then the SCE will be informed hereof and may determine whether the multi party call is allowed, considering e.g. the directory numbers of the parties involved in the multi party call. The SCE may apply different decision criteria to determine whether a multi party is allowed. E.g. a subscriber is not entitled to establish a multi party call involving international conferees.

The service control entity SCE will get informed of the specific operation performed inside the multi party call (split, adding etc.). This will allow the service control entity SCE to know at each time who is receiving information (speech/data) for the call. This, in particular, will allow the service control entity SCE to be aware of who will listen to a tone or announcement when it decides to send such tone or announcement.

It is apparent that the invention may be implemented in any telecommunication network like a GSM, Code Division Multiple Access (CDMA), Time Division Multiple Access (TDMA), Universal Mobile Telecommunication System (UMTS), or 4G network. A service control entity is typically embodied in a single device or may be distributed over several devices. The corresponding applies to a service switching entity. A service control entity and a service switching entity may be implemented as separate functions on the same device or platform.

Also provided is a computer program loadable into a processing unit of a service control entity, where the computer program comprises portions of software code adapted to perform at least one of the embodiments and methods described above.

Also provided is a computer program loadable into a processing unit of a service switching entity, where the computer program comprises portions of software code adapted to perform at least one of the embodiments and methods described above.

Also provided is a computer-readable medium product comprising at least one of the computer programs as described above.

The descriptions above are intended to be illustrative, not limiting. Thus, it will be apparent to one skilled in the art that modifications may be made to the invention as described without departing from the scope of the claims set out below.

The invention claimed is:

1. A method for controlling a multi party call between three or more communication entities within a communications network, wherein the multi party call is established using a plurality of call legs, wherein each call leg connects a call-originating communication entity with a respective call-participating communication entity in the multi-party call, wherein the communications network comprises a service control entity (SCE) and a service switching entity (SSE), wherein multiple instances of the SCE and multiple instances of the SSE are present in the communications network, wherein each pair of SCE-SSE instances is associated with a corresponding one of the plurality of call legs, and wherein the SCE performs the steps of:
   a) receiving a notification of a multi party event associated with the multi party call from one of the SSE instances; wherein the notification is received at one of the SCE instances that corresponds to the notification-sending SSE instance;
   b) obtaining from the SSE, identities of all communication entities involved in the multi party call by receiving, for each call leg, identities of all communication entities in that call leg, wherein call leg-specific identities in each call leg are received at a call leg-specific SCE instance from a corresponding call leg-specific SSE instance;
   c) determining a procedure for handling the multi party event; and
   d) transmitting instructions to the SSE in accordance with the procedure for handling the multi party event.

2. The method according to claim 1, further comprising requesting the SSE to send the notification of an indicated multi party event.

3. The method according to claim 1, wherein the notification of the multi party event comprises a request from one of the three or more communication entities for setting up the multi party call and the instructions for handling the multi party event comprise a permission indicator indicating whether or not the multi party call is allowed.

4. The method according to claim 1, wherein the step of determining a procedure for handling the multi party event comprises applying service logic.

5. The method according to claim 4, wherein the step of determining a procedure for handling the multi party event further comprises applying service logic in combination with the identity of at least one communication entity associated with the multi party event.

6. The method according to claim 1, wherein the multi party event comprises one of:
   Conference Established,
   Conference Disconnected,
   Other Party Added,
   Isolated,
   Reattached,
   Other Party Isolated,
   Other Party Reattached,
   Other Party Split,
   Other Party Disconnected, and
   Conference Floating.

7. A service control entity (SCE) for controlling a multi party call between three or more communication entities within a communications network, wherein the multi party call is established using a plurality of call legs, wherein each call leg connects a call-originating communication entity with a respective call-participating communication entity in the multi-party call, wherein the communications network further comprises a service switching entity (SSE), wherein multiple instances of the SCE and multiple instances of the SSE are present in the communications network, wherein each pair of SCE-SSE instances is associated with a corresponding one of the plurality of call legs, and wherein the SCE comprises:
   a memory for storing information;
   an input device for receiving a notification of a multi party event associated with the multi party call from one of the SSE instances, wherein the notification is received at one of the SCE instances that corresponds to the notification-sending SSE instance;
   the input device for further receiving, for each call leg, identities of all communication entities in that call leg, wherein call leg-specific identities in each call leg are received at a call leg-specific SCE instance from a corresponding call leg-specific SSE instance;
   an output device for sending instructions to the SSE; and
   a processing unit for
      processing the notification of the multi party event and identities of a communication entities associated with the multi party call,
      determining a procedure for handling the multi party event, and
      transmitting instructions via the output device to the SSE in accordance with the procedure for handling the multi party event.

8. A method for controlling a multi party call between three or more communication entities within a communications network, wherein the multi party call is established using a plurality of call legs, wherein each call leg connects a call-originating communication entity with a respective call-participating communication entity in the multi-party call, wherein the communications network comprises a service control entity (SCE) and a service switching entity (SSE), wherein multiple instances of the SCE and multiple instances of the SSE are present in the communications network wherein each air of SCE-SSE instances is associated with a corresponding one of the plurality of call legs, and wherein the SSE performs the steps of:
  a) receiving a notification of a multi party event associated with the multi party call at one of the SSE instances;
  b) sending the notification to one of the SCE instances that corresponds to the notification-receiving SSE instance;
  c) providing identities of all communication entities involved in the multi party call to the SCE by sending, for each call leg, identities of all communication entities in that call leg, wherein call leg-specific identities in each call leg are sent from a call leg-specific SSE instance to a corresponding call leg-specific SCE instance;
  d) receiving instructions from the SCE in accordance with a procedure for handling the multi party event, and
  e) processing the multi party event in accordance with the received instructions.

9. The method according to claim 8, further comprising the SSE receiving a request from the service control entity to send the notification of an indicated multi party event.

10. The method according to claim 8, wherein the notification of the multi party event comprises a request from one of the three or more communication entities for setting up the multi party call and the instructions for handling the multi party event comprise a permission indicator indicating whether or not the multi party call is allowed.

11. The method according to claim 10, wherein step e) comprises disallowing or allowing the multi party event in accordance with the permission indicator.

12. The method according to claim 8, wherein the multi party event comprises one of:
  Conference Established,
  Conference Disconnected,
  Other Party Added,
  Isolated,
  Reattached,
  Other Party Isolated,
  Other Party Reattached,
  Other Party Split,
  Other Party Disconnected, and
  Conference Floating.

* * * * *

UNITED STATES PATENT AND TRADEMARK OFFICE
CERTIFICATE OF CORRECTION

| | |
|---|---|
| PATENT NO. | : 8,363,811 B2 |
| APPLICATION NO. | : 12/809643 |
| DATED | : January 29, 2013 |
| INVENTOR(S) | : Noldus et al. |

It is certified that error appears in the above-identified patent and that said Letters Patent is hereby corrected as shown below:

Title Page, Item (57), under "ABSTRACT", in Column 2, Line 10, delete "parry" and insert -- party --, therefor.

In the Specifications

In Column 2, Line 60, delete "more then" and insert -- more than --, therefor.

In Column 4, Line 37, delete "call" and insert -- call, --, therefor.

In Column 5, Line 30, delete "entity." and insert -- entity, --, therefor.

In Column 8, Line 31, delete "call call" and insert -- call --, therefor.

In Column 9, Line 25, delete "events" and insert -- events. --, therefor.

In the Claims

In Column 14, Line 57, in Claim 7, delete "of a" and insert -- of all --, therefor.

In Column 15, Line 22, in Claim 8, delete "event," and insert -- event; --, therefor.

Page 1 of 1

Signed and Sealed this
Fourteenth Day of May, 2013

Teresa Stanek Rea
*Acting Director of the United States Patent and Trademark Office*